(12) United States Patent
Woehler

(10) Patent No.: US 8,175,799 B1
(45) Date of Patent: May 8, 2012

(54) LOCATION SYSTEM

(76) Inventor: Douglas Edward Woehler, Jackson, NJ (US)

( * ) Notice: Subject to any disclaimer, the term of this patent is extended or adjusted under 35 U.S.C. 154(b) by 139 days.

(21) Appl. No.: 10/685,364

(22) Filed: Oct. 14, 2003

Related U.S. Application Data

(60) Provisional application No. 60/418,932, filed on Oct. 15, 2002.

(51) Int. Cl.
*G01C 21/00* (2006.01)
*G06F 17/00* (2006.01)
*G08G 5/06* (2006.01)
*B64D 47/02* (2006.01)

(52) U.S. Cl. ........ 701/408; 701/516; 701/517; 340/901; 340/945; 340/991

(58) Field of Classification Search .................. 701/205, 701/206, 207, 208, 213, 214, 223, 300, 301, 701/400, 408, 516, 517; 340/901, 961, 905, 340/903, 907, 945, 952, 953, 956, 958, 972, 340/982, 983, 988, 990, 993; 342/29, 30, 342/32, 52–54, 58
See application file for complete search history.

(56) References Cited

U.S. PATENT DOCUMENTS

| | | | | |
|---|---|---|---|---|
| 3,594,790 | A | | 7/1971 | Laughlin et al. ............ 342/51 |
| 3,935,557 | A | | 1/1976 | Nichols .................... 340/948 |
| 4,134,007 | A | * | 1/1979 | Koreicho et al. ........... 398/122 |
| 4,325,146 | A | * | 4/1982 | Lennington ............... 398/108 |
| 4,527,158 | A | * | 7/1985 | Runnels .................... 340/961 |
| 4,834,531 | A | * | 5/1989 | Ward ....................... 356/5.08 |
| 5,225,828 | A | * | 7/1993 | Walleston ................. 340/953 |
| 5,253,162 | A | * | 10/1993 | Hassett ..................... 342/457 |
| 5,268,698 | A | * | 12/1993 | Smith et al. ............... 342/450 |
| 5,317,309 | A | * | 5/1994 | Vercellotti et al. .......... 340/10.5 |
| 5,321,615 | A | * | 6/1994 | Frisbie et al. ............... 701/24 |
| 5,448,243 | A | | 9/1995 | Bethke et al. .............. 342/59 |
| 5,483,455 | A | | 1/1996 | Lay et al. ................. 701/206 |
| 5,493,309 | A | | 2/1996 | Bjornholt ................. 342/455 |
| 5,519,618 | A | * | 5/1996 | Kastner et al. ............ 701/120 |
| 5,619,211 | A | | 4/1997 | Horkin et al. ........... 342/357.17 |
| 5,666,109 | A | * | 9/1997 | Fukui et al. ............... 340/905 |
| 5,721,678 | A | * | 2/1998 | Widl ........................ 705/417 |
| 5,805,082 | A | * | 9/1998 | Hassett .................... 340/928 |
| 6,091,358 | A | * | 7/2000 | Maniscalco et al. ...... 342/357.1 |
| 6,219,596 | B1 | * | 4/2001 | Fukae et al. ............... 701/23 |

(Continued)

OTHER PUBLICATIONS

Paramvir Bahl and Venkata N. Padmanabhan, RADAR: An In-Building RF-based User Location and Tracking System, IEEE INFOCOM 2000.*

*Primary Examiner* — Jack W Keith
*Assistant Examiner* — Edward Pipala
(74) *Attorney, Agent, or Firm* — Dicke, Billig & Czaja PLLC

(57) ABSTRACT

One embodiment of the present invention provides a ground surface location system for identifying an object and its location within a coverage area. The ground surface location system includes a location transmitter and a location identifier. The location transmitter is positioned at a location within the coverage area and has a physical location code corresponding to the location stored therein, and is configured to provide an optical signal representative of the physical location code. The location identifier is adapted to couple to the object and has an object identification code representative of the object stored therein, and is configured to receive the optical signal and to transmit an identification signal representative of the physical location code and the object identification code.

35 Claims, 9 Drawing Sheets

U.S. PATENT DOCUMENTS

| | | | |
|---|---|---|---|
| 6,253,064 B1 | 6/2001 | Monroe | 455/66.1 |
| 6,327,535 B1* | 12/2001 | Evans et al. | 701/300 |
| 6,381,541 B1* | 4/2002 | Sadler | 701/301 |
| 6,388,755 B1* | 5/2002 | Zhao et al. | 356/614 |
| 6,606,033 B1* | 8/2003 | Crocker et al. | 340/901 |
| 6,693,512 B1* | 2/2004 | Frecska et al. | 340/10.1 |
| 6,920,390 B2* | 7/2005 | Mallet et al. | 701/120 |
| 2002/0126022 A1* | 9/2002 | Ellis | 340/901 |
| 2002/0187779 A1* | 12/2002 | Freeny, Jr. | 455/422 |
| 2003/0011494 A1* | 1/2003 | Reider et al. | 340/993 |
| 2003/0125868 A1* | 7/2003 | Giannopoulos et al. | 701/200 |
| 2004/0036611 A1* | 2/2004 | Kidney et al. | 340/573.1 |
| 2006/0145893 A1* | 7/2006 | Hassett | 340/928 |
| 2008/0310850 A1* | 12/2008 | Pederson et al. | 398/135 |

* cited by examiner

LOCATION SYSTEM

CROSS REFERENCE TO RELATED APPLICATION

The subject matter of this application is related to the subject matter of U.S. Provisional Patent Application No. 60/418,932, filed Oct. 15, 2002, priority to which is claimed under 35 U.S.C. §119(e) and which is incorporated herein by reference

THE FIELD OF THE INVENTION

The present invention relates generally to location systems, and more particularly to a ground surface location system utilizing optical signals representative of location information.

BACKGROUND OF THE INVENTION

Runway incursions are a significant hazard for aircraft taxiing on airfields. In low visibility conditions, runway incursions can significantly increase the risk of collisions between arriving and departing aircraft. To reduce the risk of incursions, low visibility taxi plans have been developed and are employed when takeoff and landing operations have less than a specified runway distance available. Stop bars have been installed at runway intersections to further reduce the chance of incursions. Additionally, taxiway centerline lights, runway edge lights and other geographic position markers have been installed on airfields to provide visual location queues to aircraft pilots. While such approaches are economical to implement, they rely heavily on pilot skill to be effective and do not provide automated updates of changing aircraft location information to air traffic control personnel.

Other systems, such as ground radar systems or systems using global positioning system (GPS) receivers, are capable of transmitting aircraft location information to air traffic control personnel. However, while these systems are capable of indicating the location of an object, the object is not identified. Thus, while air traffic control personnel are aware of the location of the object on the airfield, they have no indication as to whether the object is an airplane or a ground support vehicle, let alone tail number or flight number information if the object is an aircraft. Furthermore, these systems can be costly to implement and often do not integrate easily with existing airfield runway control systems.

SUMMARY OF THE INVENTION

One embodiment of the present invention provides a ground surface location system for identifying an object and its location within a coverage area. The ground surface location system includes a location transmitter and a location identifier. The location transmitter is positioned at a location within the coverage area and has a physical location code corresponding to the location stored therein, and is configured to provide an optical signal representative of the physical location code. The location identifier is adapted to couple to the object and has an object identification code representative of the object stored therein, and is configured to receive the optical signal and to transmit an identification signal representative of the physical location code and the object identification code.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
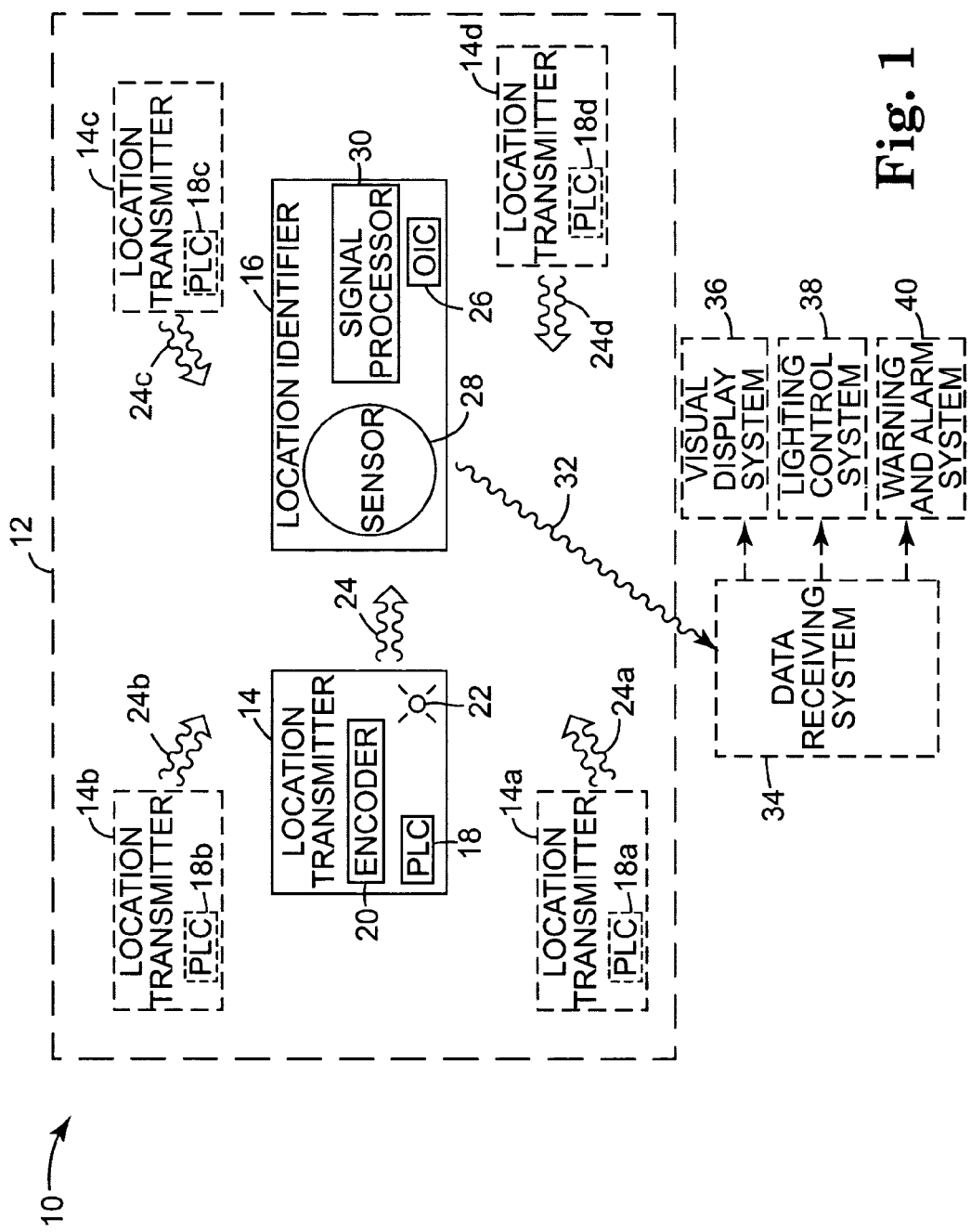
FIG. 1 is a block diagram illustrating one exemplary embodiment of a ground surface location system according to the present invention.

FIG. 1 illustrates generally one exemplary embodiment of a ground surface location system 10 according to the present invention for identifying a location of an object within a coverage area 12. Ground surface location system 10 includes a location transmitter system 14 and a location identifier system 16. Location transmitter system 14 includes a physical location code (PLC) 18 stored therein that corresponds to a location within coverage area 12 at which location transmitter system 14 is located, a location encoder 20, and a light source 22. Location encoder 20 is configured to control light source 22 so as to cause location transmitter 14 to continually transmit a digital optical signal 24 representative of PLC 18.

Location identifier system 16 includes an object identification code (OIC) 26 stored therein, an optical sensor 28, and a signal processor 30. Optical sensor 28 is configured to receive digital optical signal 24 and signal processor 30 is configured to cause location identifier system 16 to transmit an identification signal 32 representative of PLC 18 and OIC 26. In one embodiment, ground location system 10 further includes a data receiving system 26 configured to receive identification signal 32.

In one embodiment, ground surface location system 10 further includes a plurality of location transmitters 14a-14d, each having a corresponding PLC 18a-18d stored therein and transmitting a corresponding digital optical signal 24a-24d representative of its corresponding PLC 18a-18d. In one embodiment, each location transmitter 14 and 14a-14d has a unique PLC. In one embodiment, a group of location transmitters in proximity to one another have a same PLC. In one embodiment, location identifier 16 is configured to receive the plurality of digital optical signals 24, 24a-d and to transmit an identification signal 32 representative of object identification code 26 and the PLC of the location transmitter or group of location transmitters to which location identifier 16 is in closet proximity.

In one embodiment, as will be described in more detail below, ground surface location system 10 is configured as an airfield surface movement location system, wherein coverage area 12 is an airfield, and location transmitters 14 and 14a-14d comprise airfield visual guidance markers, such as taxiway edge lights and centerline lights. In one embodiment, location identifier system 16 is mounted to an aircraft. In one embodiment, OIC 26 is representative of a tail number and a flight number associated with the aircraft to which location identifier system 16 is mounted. As the aircraft moves within airfield 12, location identifier system 16 receives digital optical signals 24 and 24a-24d and transmits identification signal 32 representative of the aircraft's tail and flight numbers and the PLC of the location transmitter, or guidance marker, to which the aircraft is in closest proximity. In one embodiment, data receiving system 34 is located in an airfield control tower. In one embodiment, data receiving system 34 is adapted to provide location information to a visual display system 36, a lighting control system 38, and a warning and alarm system 40.

When configured as an airfield surface location system, ground surface location system 10 according to the present invention provides air traffic control personnel with information that both identifies and provides the location of an object on the airfield. In the case of an aircraft, ground surface location system not only provides the location of the aircraft but also identifies the aircraft via a tail number and a flight number associated with the aircraft. Additionally, ground surface location system 10 integrates well with guidance marker systems required on every airfield serving commercial or military aircraft and provides better accuracy than existing systems.

Figure 2:
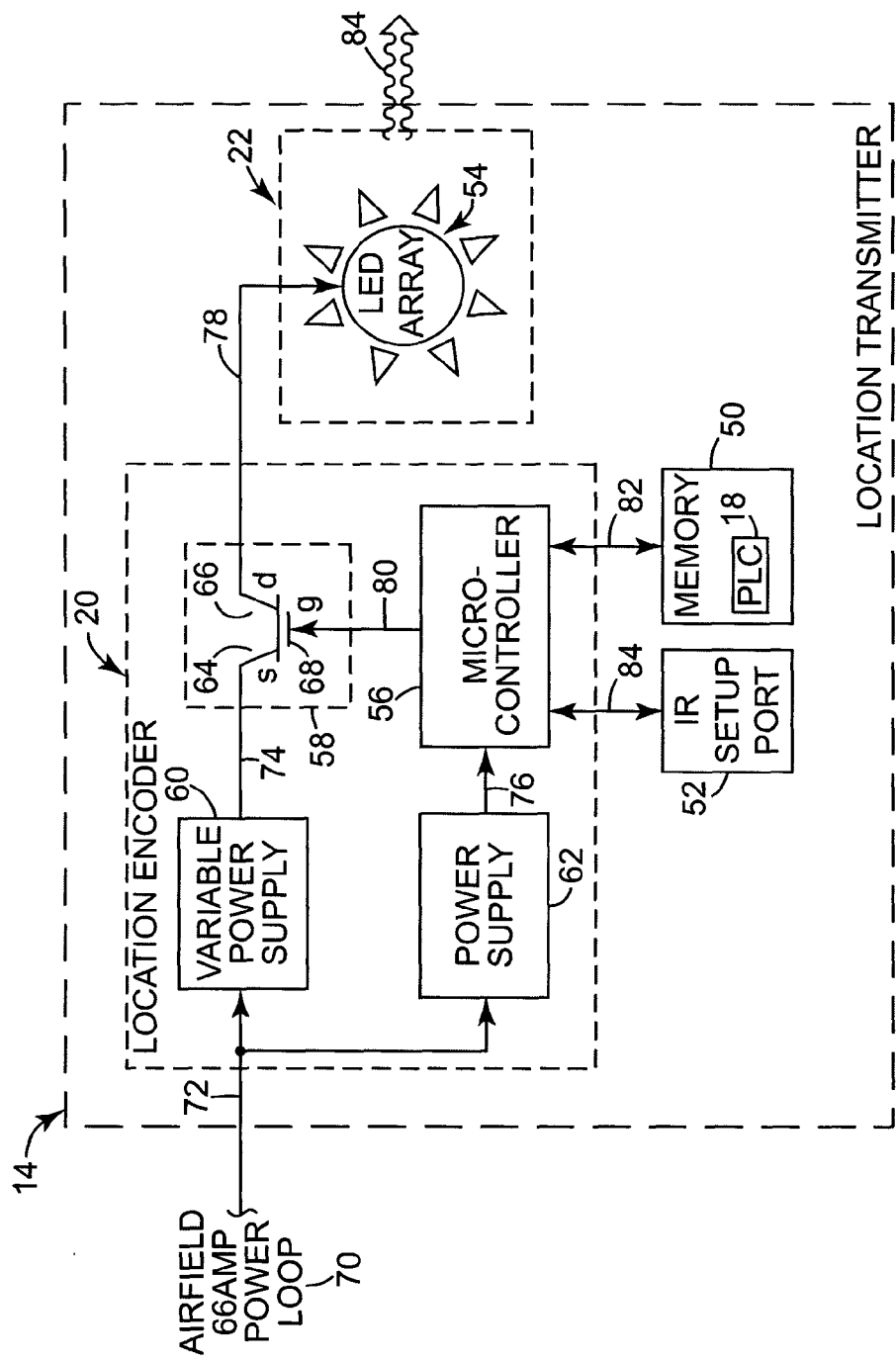
FIG. 2 is a block diagram illustrating one exemplary embodiment of a location transmitter system according to the present invention.

FIG. 2 is a block diagram illustrating one exemplary embodiment of location transmitter system 14 according to the present invention configured as a Federal Aviation Association (FAA) airfield guidance marker. Location transmitter system 14 includes location encoder 20, light source 22, a non-volatile memory 50, and an infrared (IR) setup port 52. Light source 22 further includes a light emitting diode (LED) array 54. In one embodiment, LED array 54 includes a laser diode. In one embodiment, light source 22 comprises an FAA type L861T taxiway edge light fixture as used on airfield taxiway and apron areas. In one embodiment, light source 22 comprises an FAA type L852 taxiway centerline light fixture.

Location encoder 20 further includes a microcontroller 56, a power switch 58, a variable power supply 60, and a constant power supply 62. Power switch 58 includes a source 64, a drain 66, and a control gate 68. Variable power supply 60 and constant power supply 62 are connectable to an airfield power loop 70 via a path 72. Typically, airfields employ a 6.6 amp power loop as part of an airfield power system designed in accordance with FAA requirements.

Variable power supply 60 provides a variable DC voltage to source 64 of power switch 58 via a path 74. In one embodiment, variable power supply 60 provides a voltage that can be varied between 0VDC and 12VDC. Constant power supply 62 provides a constant DC voltage to microcontroller 56 via a path 76. In one embodiment, constant power supply 62 provides a constant 5VDC to microcontroller 56. LED array 54 receives the variable DC voltage from variable power supply 60 via a path 78 from drain 66 of power switch 58. Microcontroller 56 is coupled to control gate 68 via a path 80, to non-volatile memory 50 via a path 82, and to IR setup port 52 via a path 84.

In the exemplary embodiment, PLC 18 is stored in non-volatile memory 50. IR setup port 52 provides a means of setting PLC 18 in non-volatile memory 50 via microcontroller 56. Location transmitter system 14 is given via IR port 52 a discreet PLC 18 that corresponds to a particular location within airfield coverage area 12 at which location transmitter system 14 is installed. No other location transmitter system installed within airfield coverage area 12 has the same PLC, unless it is desirable to have a plurality of location transmitter systems proximate to one another share a same PLC. The location of location transmitter system 14 and all other location transmitter systems installed within airfield coverage area 12 are tracked on a map indicating the location of each guidance markers on the airfield.

In one embodiment, PLC 18 is stored within non-volatile memory 50 before location transmitter system 14 is installed on the airfield. In one embodiment, PLC 18 is stored after location transmitter system 14 is installed on the airfield. In one embodiment, PLC 18 is stored within non-volatile memory 50 when location transmitter system 14 is manufactured. In one embodiment, PLC 18 comprises a five-digit number. In various embodiments, location transmitter system 14 can communicate with data receiving system 34 using wireless communication, fiber optic communication, infrared communication or other suitable technologies.

Microcontroller 56 provides a power switch control signal to control gate 68 via path 80. The power switch control signal is based on PLC 18 and causes power switch 58 to turn on-and-off, which consequently turns the variable DC voltage to LED array 54 on-and-off in a fashion such that LED array 54 generates digital optical signal 24 encoded with PLC 18. Microcontroller 56 continuously provides the power switch control signal to power switch 58 so that PLC 18 is continuously being transmitted via digital optical signal 24.

In one embodiment, microcontroller 56 employs a Manchester coding scheme to encode the power switch control signal with PLC 18, wherein the power switch control signal provided to control gate 68 via path 80 is a serial data stream designed to provide a 50% duty cycle to LED array 54. By employing a Manchester coding scheme, the power switch control signal will provide a 50% duty cycle to LED array 54 for any PLC stored in memory 50 and will not change the apparent brightness of LED array 54.

The on-and-off switching of LED array 54 occurs at a rate above the maximum rate at which a human eye is capable of detecting a flashing light source. Typically, the human eye can detect flashing at a rate less than 16 Hz. For instance, televisions and other display devices often employ refresh rates between 24 Hz and 30 Hz. The flash rate of LED array 54 occurs at a rate many times above 16 Hz, at a rate sufficient to provide a baud rate capable of transmitting PLC 18 many times per second. LED's and laser diodes have substantially no thermal inertia as do filament type lamps and, thus, can be turned on-and-off in microseconds which allows emitted light to be serially encoded with the PLC.

Figure 3:
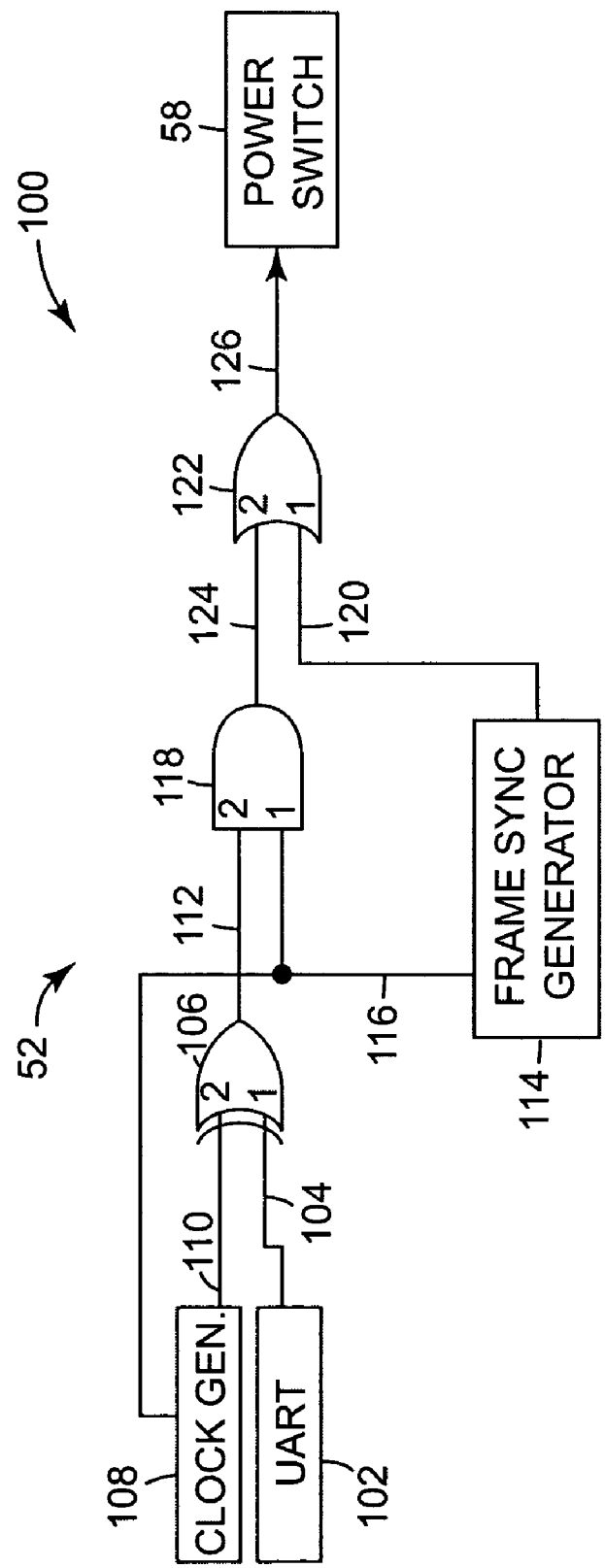
FIG. 3 is a logic diagram illustrating one exemplary embodiment of a location encoder according to the present invention.

FIG. 3 is a simplified logic diagram 100 illustrating the logical operation of one exemplary embodiment of location encoder 20 according to the present invention. A standard universal asynchronous receiver transmitter (UART) 102 is coupled via path 104 to a first input of an EXCLUSIVE-OR gate 106. UART 102 is programmed to provide at 104 a data stream having a non-return-to-zero (NRZ) format that is representative of a physical location code, such as PLC 18, which in-turn is representative of the location within airfield coverage area 12 of location transmitter system 14. In one embodiment, the data stream is representative of the PLC followed by its complement. A clock generator 108 provides a bit clock at 110 to a second input of an EXCLUSIVE-OR gate 106. Clock generator 108 in combination with EXCLUSIVE-OR gate 106 converts the NRZ data stream at 104 to a Manchester encoded data stream at 112 (see also FIG. 5 below).

Frame sync generator 114 provides a disable output at 116 to clock generator 108 and to a first input of an AND gate 118. AND gate 118 receives at a second input the Manchester encoded data stream at 112. Frame sync generator 114 further provides a frame sync output at 120 to a first input of an OR gate 122. AND gate 118 has an output 124 coupled to a second input of OR gate 122. OR gate 122 has an output 126 coupled to power switch 64. Frame sync generator 114 is configured to provide a power switch control signal at output 126 that sequences between the frame sync output at 120 and the Manchester encoded data stream at 112.

The frame sync output at 120 is utilized to simplify data reception by location identifier system 16. The frame sync output is a unique, distinguishable signal utilized by location identifier system 16 for proper bit clock alignment. When frame sync generator 114 is providing the frame sync output at 120 to power switch 64 via OR gate 122, the disable output at 116 blocks the Manchester encoded data stream from passing through AND gate 118. The disable output at 116 also aligns the bit clock at 110 with the start of the frame sync output at 120. After the frame sync output is complete, the disable output enables clock generator 108 and AND gate 118 to pass the Manchester encoded data stream.

Figure 4:
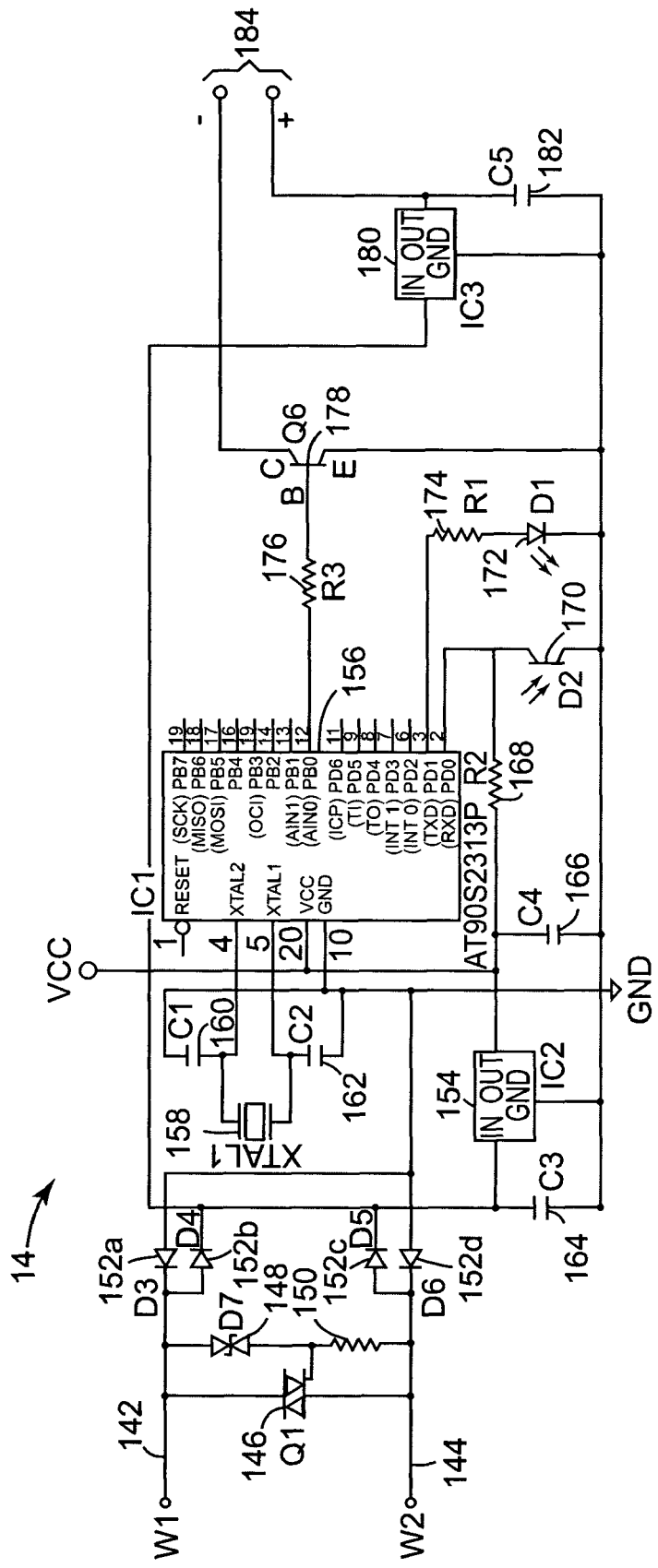
FIG. 4 is a schematic diagram illustrating one exemplary embodiment of a location encoder according to the present invention.

FIG. 4 is a schematic diagram illustrating one exemplary embodiment of location transmitter system 14 according to the present invention. Location transmitter system 14 has a terminal W1 at 142 and a terminal W2 at 144 which are connectable to a series transformer (not shown). Q1 illustrated at 146 is a triac and D7 illustrated at 148 is a dual zener diode. A resistor R5 at 150 is coupled between triac 146 and terminal 144 and is used as a current limiting resistor. When a peak-to-peak AC input voltage from the series transformer between terminals W1 142 and W2 144 is higher than 20 volts, the input voltage is limited to a 20 volts. Diodes at 152a, 152b, 152c, and 152d are configured as a rectifier and rectify the 20 volt AC peak-to-peak signal to approximately 14 volts DC. A voltage regulator IC2 at 154 regulates the 14 volt DC signal and provides a 5 volt DC output for use by IC1 156.

In the illustrated embodiment, IC1 156 is an 8-bit microcontroller which includes a universal asynchronous receiver transmitter (UART). XTAL1 at 158 is a 3.6864 MHz crystal oscillator which provides a timing input to IC1 156. Capacitors C1 at 160 and C2 at 162 are filtering capacitors which remove noise and jitter from the output of XTAL1 158. Capacitors C3 at 164 and C4 at 166 are filtering capacitors which respectively remove noise from the input and output of IC2 154. The output of IC2 154 couples through resistor R2 at 168 to D2 at 170. An infrared detecting photodiode D2 170 receives a PLC representative of a specific physical location from a programming device via IR setup port 60 (see also, FIG. 2). An infrared emitting diode D1 at 172 is coupled to IC1 156 via a resistor R1 at 174, and retransmits the PLC information received via IR setup port 64 to the programming device for verification of content.

IC1 156 generates and provides via a resistor R3 at 176 the power switch control signal encoded with the physical location code to a control gate of a transistor Q6 at 178. In the illustrated embodiment, transistor Q6 178 corresponds to power switch 64 illustrated in FIG. 2 and FIG. 3 above. An output port 184 is coupled across an output of transistor Q6 178 and a voltage regulator IC3 at 180. A filtering capacitor C5 at 182 is coupled across an output of voltage regulator IC3 180. Output port 184 provides a modulated output voltage to LED array 54 that causes it to turn off and on in a fashion so as to provide a Manchester encoded digital optical signal. In the exemplary embodiment, IC1 156 generates the power switch control signal encoded with the physical location code for LED array 54. In other embodiments, other suitable components can be used which transmit the PLC location information as a Manchester coded data stream.

Figure 5:
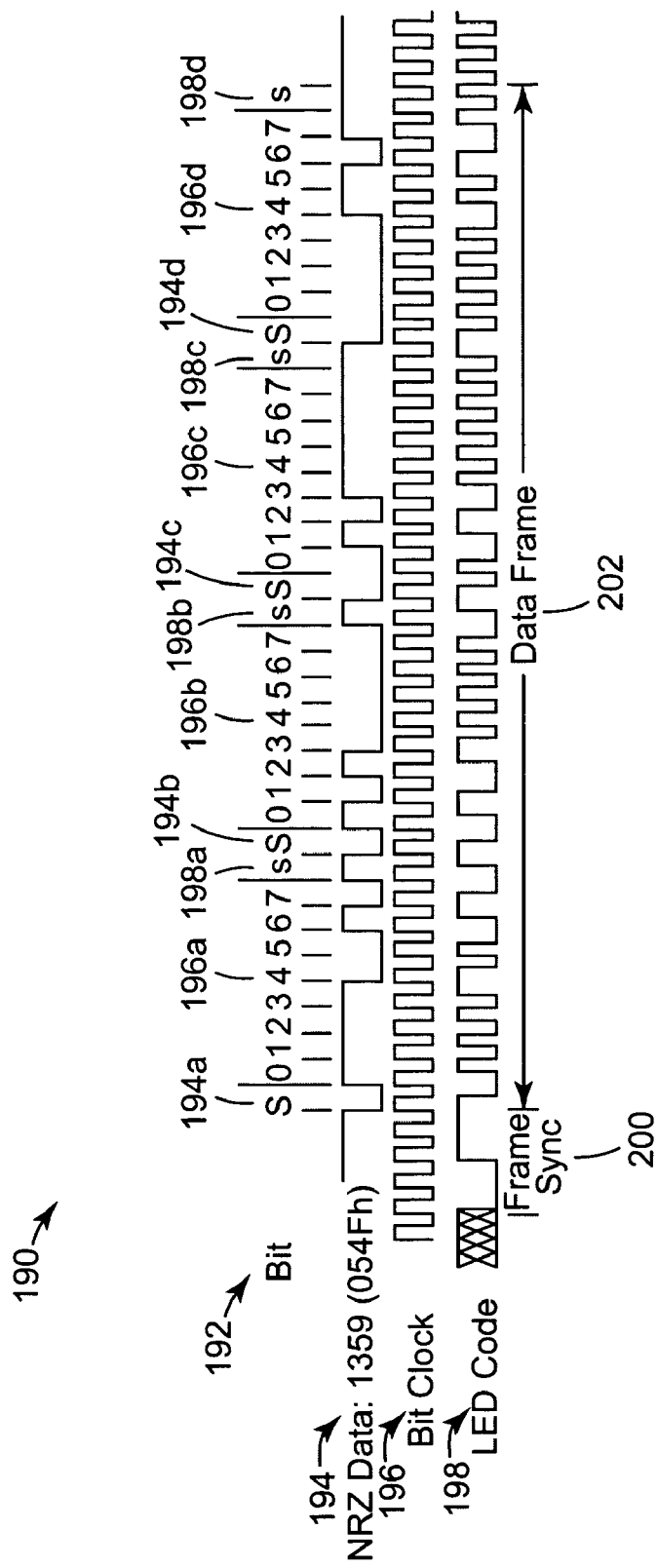
FIG. 5 is an example timing diagram illustrating the operation of one exemplary embodiment of a location encoder according to the present invention.

FIG. 5 is a timing diagram 190 illustrating generally at 190 one exemplary embodiment of location encode 20 encoding the power switch control signal with the physical location code. A first line illustrates a bit sequence 192 for a data frame 202. Four bytes are sent per data frame 202, with each byte including 8 data bits at 196 and having an associated start bit 194 and stop bit 198. A second line illustrates a data stream 194 having a non-return-to-zero (NRZ) format representative of the physical location code. Data stream 194 is illustrative of the data stream provided by UART 102 at 104 in FIG. 3 above. In the illustrative example, the bit sequence comprises a 2-byte physical location code followed by its 2-byte complement to provide redundancy for error checking. Each of the two multi-byte numbers are sent little endian (i.e., least significant bit first).

A third line at 196 illustrates a bit clock signal provided by XTAL1 158 (see FIG. 4) or clock generator 108 (see FIG. 3) and is used to convert NRZ data stream 194 to a Manchester coded data stream as present at 112 in FIG. 3 above. Bit clock signal 196 is aligned with the start of a frame sync sequence illustrated at 200. The frame sync sequence at 200 is used to simplify data reception and provide location data decoder system 20 with a distinguishable signal to be used for bit clock alignment. Both frame sync sequence 200 and bit clock signal 196 start low.

Lastly, a fourth line 198 illustrates the power switch control signal, or LED code, provided at 80 in FIG. 2 or 126 in FIG. 3 to the control gate of power switch 58. The power switch control signal is a Manchester coded data stream representative of the NRZ data at 194. A Manchester encoded bit contains a transition at the midpoint of a bit period with the direction of the transition determining whether the bit is a "0" or a "1," wherein the first half is the true bit value and the second half is the complement.

Figure 6:
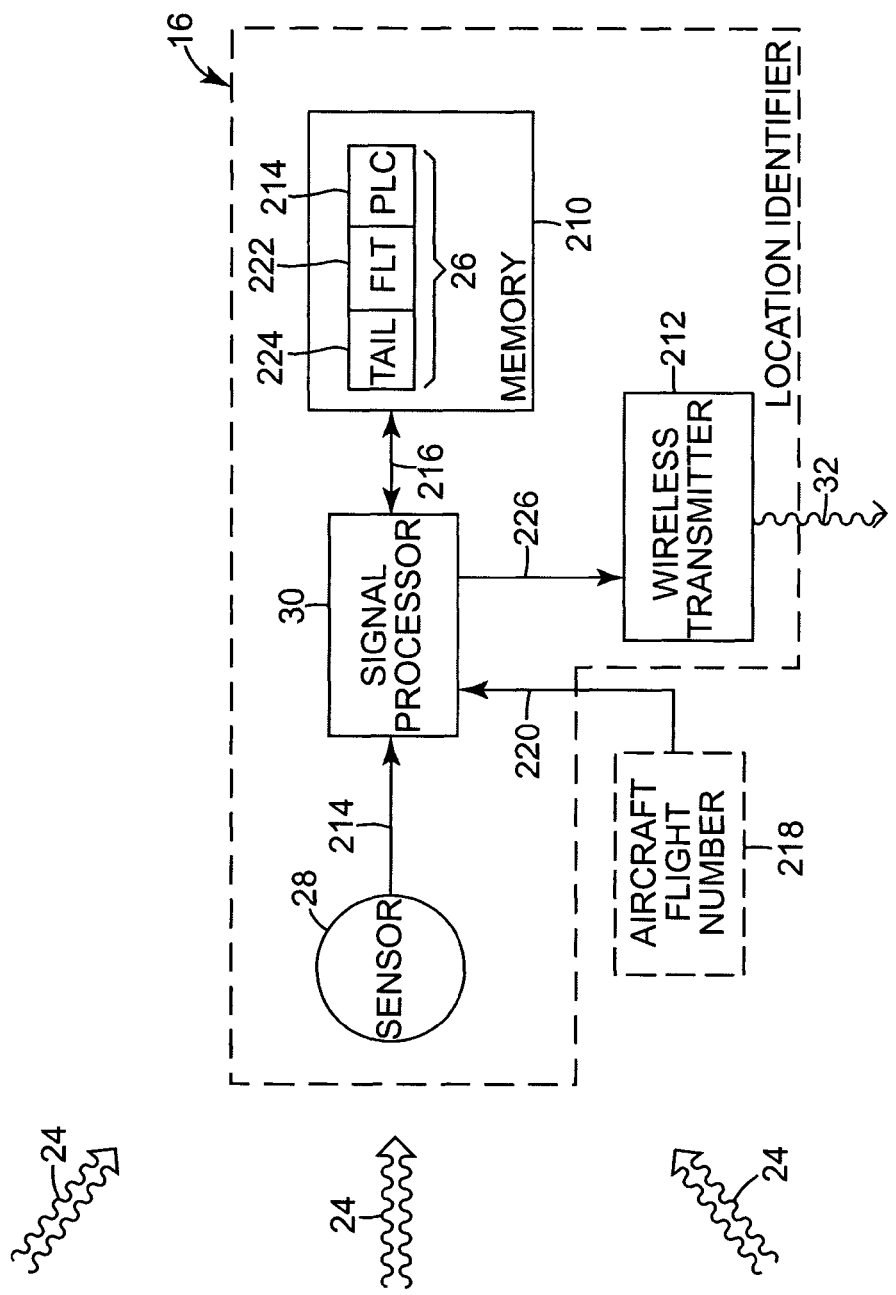
FIG. 6 is a block diagram illustrating one exemplary embodiment of a location identifier system according to the present invention.

FIG. 6 is a block diagram illustrating one exemplary embodiment of a location identifier system 16 according to the present invention. Location identifier 16 includes sensor 28, signal processor 30, a memory 210, and a wireless transmitter 212. In the exemplary embodiment, location identifier system 16 is mounted on an aircraft. In one embodiment, location identifier system 16 is mounted on the underside, or belly, of an aircraft forward of its front wheel. In one embodiment, location identifier system 16 is mounted in the front nose section of an aircraft. In one embodiment, location identifier system 16 is integrated into an aircraft. In one embodiment, location identifier system 16 is integrated into electronic systems located on an aircraft. In other embodiments, location decoder system 16 is mounted on any suitable moveable object or vehicle including, but not limited to ground support vehicles that may be on active areas of an airfield.

In the illustrated embodiment, sensor 28 is a photocell type device configured to continuously receive a plurality of digital optical signals 24 from location transmitters 14 (see FIG. 1), wherein each digital optical signal is encoded with a PLC unique to a location transmitter 14 or group of location transmitters. Sensor 28 converts the received digital optical signals to electrical signals and provides them in the form of a data stream to signal processor 30 via a path 214.

Signal processor 30 determines from the data stream a plurality of PLC's encoded in the plurality of digital optical signals 24. Signal processor 30 further determines from the plurality of PLC's the PLC of the location transmitter, or group of location transmitters, to which location identifier system 16 is in closest proximity and stores this PLC at a location 214 in memory 210 via a path 216. In one embodiment, such a determination is made by based on a signal strength of a digital optical signal received from a single location transmitter or on a collective signal strength of a plurality of digital optical signals received from a plurality of location transmitters having a same PLC. Signal processor 30 continuously evaluates the received digital optical signals 24 and updates the PLC stored at memory location 214 so that it corresponds to the PLC to which location identifier system 16 is currently in closest proximity.

Signal processor 30 is configured to receive data representative of a flight number 218 associated with the aircraft via a path 220 and stores the flight number at a location 222 in memory 210. In one embodiment, signal processor 30 receives the flight number 218 from a same source that receives/provides the aircraft's flight number from/to a radar transponder system. Flight numbers are not fixed, and such radar transponder systems contain the most current flight number associated with the aircraft In one embodiment, signal processor 30 is configured to receive both the flight number and tail number from the aircraft's radar transponder number. Data representative of the aircraft's tail number is stored at a memory location 224. An aircraft's tail number is assigned at manufacture, and remains fixed throughout the life of the aircraft.

Signal processor 30 combines the PLC, tail number, and flight number stored respectively at memory locations 214, 222 and 224 to form object identification code (OIC) 28 associated with the aircraft. Signal processor 30 continually provides OIC 28 via a path 226 to wireless transmitter 212 which continually transmits identification signal 32 which is representative of OIC 28. In one embodiment, wireless transmitter 212 is an existing wireless transmitter on the aircraft to which signal processor 30 is adapted to communicate via path 226 and transmits identification signal 32 via a spare channel.

In one embodiment, location identification system 16 is mounted to a moveable object or ground support vehicle that may be on active areas of an airfield. In such instances, a vehicle or object identification number is stored at a location in memory 210 in lieu of the flight and tail numbers stored respectively at locations 222 and 224.

Figure 7:
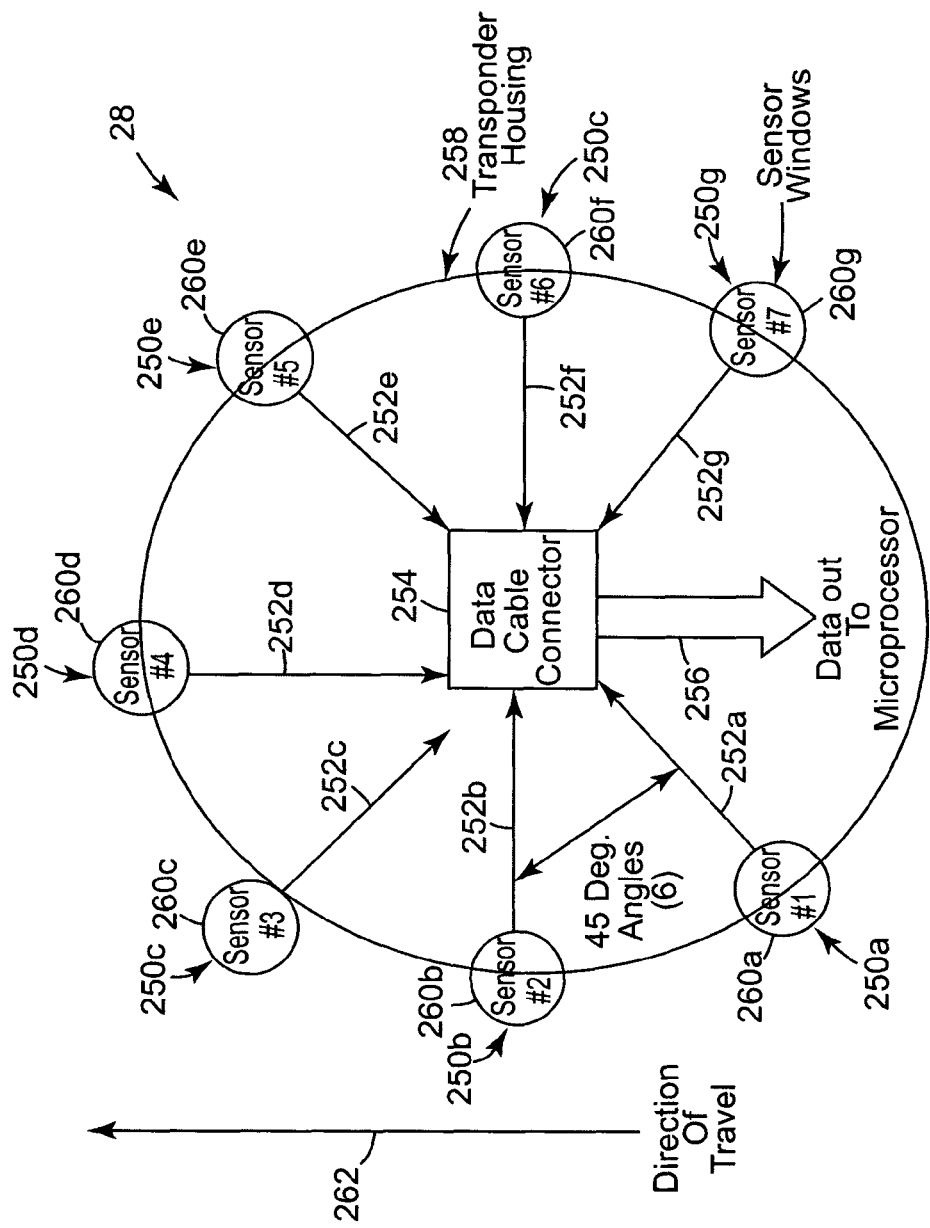
FIG. 7 is a bock diagram illustrating one exemplary embodiment of a sensor system according to the present invention.

FIG. 7 is a diagram illustrating an exemplary embodiment of sensor 28 according to the present invention. In the exemplary embodiment, sensor includes a plurality of sensors 250a-250g configured to receive digital optical signals, such as digital optical signals 24 of FIG. 1. In the illustrated embodiment, the sensors 250a-250g comprise photocell type devices that communicate detected digital optical signal information via paths 252a-252g to a data cable connector 254. Data cable connector 254 includes an output at 256 that provides the received data from the sensors as a data stream (see also FIG. 6) to signal processor 30.

In the illustrated embodiment, sensors 250a-250g are located with a housing 258, with each sensor having a sensor window 260a-260g providing an aperture through housing 258 through which PLC information can be detected by sensors 250a-250g. In the illustrated embodiment, sensor 28 is part of a location identifier system 16 mounted on an aircraft, and sensors 250a-250g are spaced at 45° intervals over a 270° range, 135° to each side of a direction of travel 262.

Figure 8:
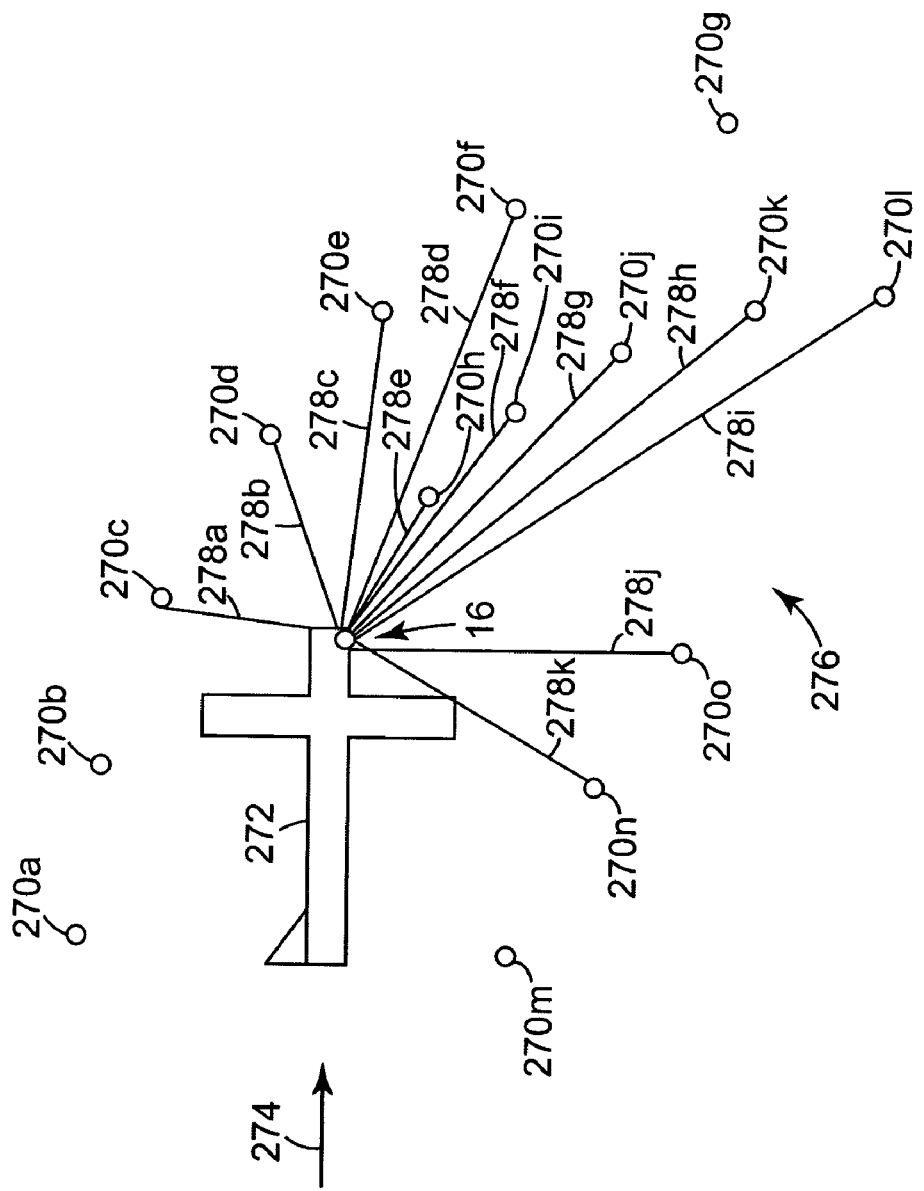
FIG. 8 is a diagram illustrating one exemplary embodiment of communication in an airfield setting between a plurality of location transmitter systems and a location identifier system according to the present invention.

FIG. 8 is a diagram illustrating an exemplary embodiment of communication between location transmitter systems 270 and location identifier system 16. In the illustrated embodiment, location transmitter systems 270 comprise airfield visual guidance markers 270a-270o and location identifier system 16 is mounted to a body of an aircraft 272. In the illustrated embodiment, location data encoder systems 270a-270g and 270m-270o comprise FAA type L861T taxiway edge lighting fixtures used on taxiways and apron areas, while location data encoder systems 270h-270l comprise FAA type L852 taxiway centerline lights. In one embodiment, the L861T and L582 fixtures include LED arrays, such as LED arrays 54.

In the illustrated embodiment, location transmitters 270a-270o continuously transmit a digital optical signal representative of a PLC stored therein, with each location transmitter 270a-270o having a transmission range. In one embodiment, each location transmitter system 270 has a unique PLC corresponding to a physical location on the airfield. In one embodiment, a group of location transmitter systems proximate to one another share a same PLC. By transmitting a digital optical signal representative of its associated PLC, each location transmitter system 270 provides positive location identification to aircraft 272 having location identifier system 16. As described above, transmission of the PLC via the emitted light of the guidance marker is at a rate high enough so as not to affect the apparent brightness of the guidance marker to a pilot in aircraft 272.

As aircraft 272 moves in the direction of arrow 274 down runway 276, location identifier system 16 continuously receives digital optical signals from location transmitter systems 270. In the illustrated embodiment, location identifier system 16 is located on the front underbody of aircraft 272. The location transmitters from which location identifier system 16 receives digital optical signals changes as airplane 272 moves into and out of the location transmitters' transmission ranges, and as the location transmitters within 135° of either side of the direction of movement 274 changes.

Location identifier system 16 receives PLC information from location transmitter systems 270 as indicated by associated paths 278a-278k. In the illustrated embodiment, location data transmitter systems 270a, 270b, and 270m are located outside of the 270o window of detection of sensor 28, while location transmitter systems 270g and 270i are at a distance from location identifier system 16 greater than the range of their encoded digital optical signals. Location identifier 16 determines the PLC of the location transmitter 270, or group of location transmitters to which it is in closet proximity and transmits a wireless identification signal 279 representative of such PLC and the aircraft's tail and flight numbers.

Figure 9:
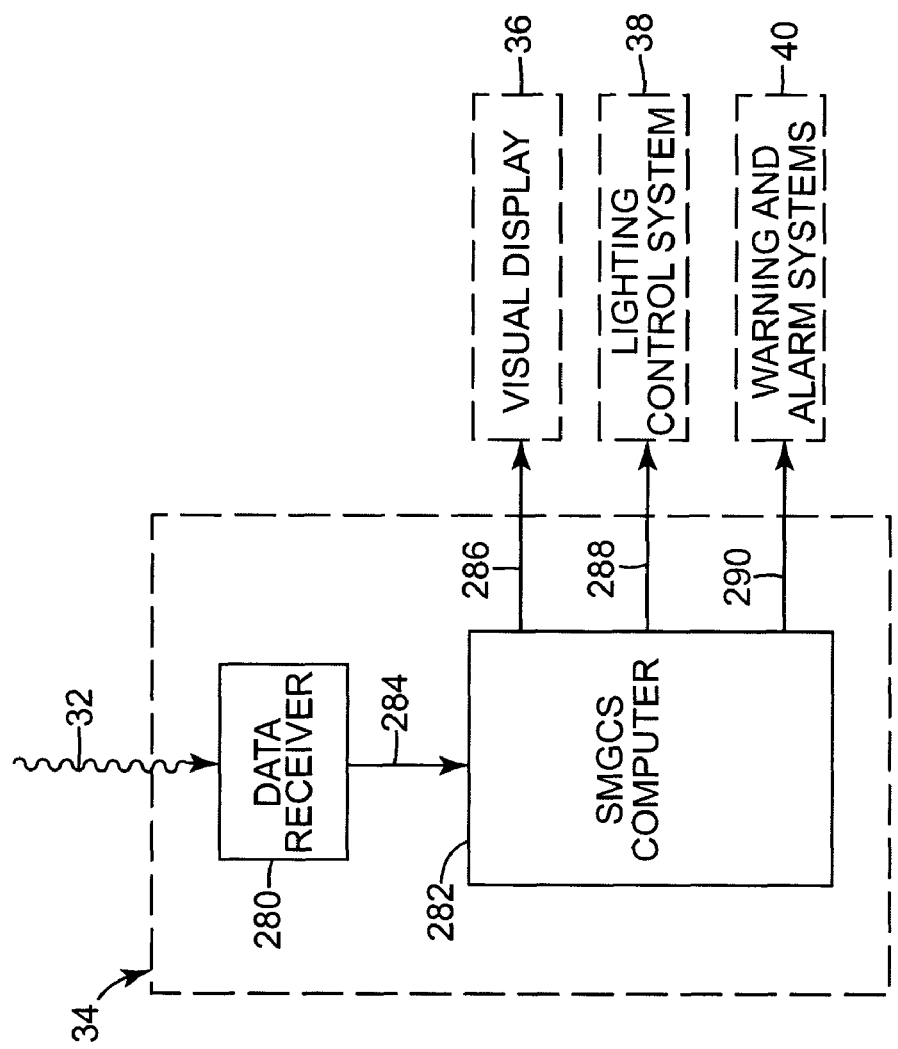
FIG. 9 is a block diagram illustrating one exemplary embodiment of a data receiving system according to the present invention.

FIG. 9 is a block diagram illustrating one exemplary embodiment of data receiving system 34 according to the present invention. In the illustrated embodiment, data receiving system 34 includes a data receiver 280 and a surface movement guidance and control system (SMGCS) computer 282. Data receiver 280 is configured to receive wireless location identification signal 32 from location identifier system 16 and to provide the received signal to (SMGCS) computer 282 at 284. In one embodiment, data receiving system 34 is located within an airfield control tower. In one embodiment, data receiver 280 is an existing control tower data receiver configured to receive identification signal 32 on an available channel.

Data processing computer 282 is configured to process the identification signal in accordance with FAA guidelines to thereby provide location information associated with a vehicle on the airfield. In the case of an aircraft, the location information includes the location, tail number, and flight number of the associated aircraft. In one embodiment, SMGCS computer 282 is adapted to provide location information via a path 286 to a visual display 36 employed by air traffic controllers (ATC's) to display positions of objects on the airfield. In one embodiment, SMGCS computer 282 is adapted to provide location information via a path 288 to lighting control system 38 that employs the data to control airfield guidance markers in a manner so as to a visual path for an aircraft to follow to a gate or runway. In one embodiment, SMGCS computer 282 is configured to track locations of all airfield objects having location identification systems associated therewith, and is adapted to provide location information via a path 290 to warning and alarm system 40 to aid in preventing incursions and collisions.

In summary, when configured as an airfield surface location system, ground surface location system 10 according to the present invention provides air traffic control personnel with information that both identifies and provides the location of an object on the airfield. In the case of an aircraft, ground surface location system not only provides the location of the aircraft but also identifies the aircraft via a tail number and a flight number associated with the aircraft. Additionally, ground surface location system 10 integrates well with guidance marker systems which are required on every airfield serving commercial or military aircraft and which have power systems already in place, and provides better accuracy than existing systems. Furthermore, ground surface location system 10 integrates easily with lighting control system computers used to control guide light systems and with warning and alarm systems.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A ground surface location and identification system comprising:
   a location transmitter positioned at a location within a coverage area and having stored therein a physical location code corresponding to the location and configured to provide an optical signal representative of the physical location code; and
   a location identifier configured to couple to a moveable object and having an object identification code representative of the object stored therein, and configured to receive the optical signal and to transmit, via a wireless transmitter, an identification signal representative of the physical location code and the object identification code.

2. The ground surface location system of claim 1, further comprising:
   a plurality of location transmitters positioned at a plurality of locations within the coverage area, each location transmitter having stored therein a corresponding physical location code representative of the location at which it is positioned and each configured to transmit an optical signal representative of the corresponding physical location code.

3. The ground surface location system of claim 2, wherein the location identifier is further configured to receive a plurality of optical signals and to transmit a signal representative of the object identification code and the physical location code of the location transmitter to which the location identifier is in closest proximity.

4. The ground surface location system of claim 1, wherein the location transmitter further comprises:
   a light source configured to receive power from a power source; and
   a location encoder having the physical location code stored therein and configured to generate the optical signal by turning the power to the light source on and off based on the physical location code.

5. The ground surface location system of claim 4, wherein the light source comprises a light emitting diode (LED) array.

6. The ground surface location system of claim 4, wherein the light source comprises a laser diode.

7. The ground surface location system of claim 4, wherein the location encoder comprises:
   a power switch connectable to the power source and having a control gate and configured to provide power to the light source;
   a microcontroller having the physical location code stored therein and configured to provide to the control gate a power switch control signal representative of the physical location code that causes the power switch to turn the power to the light source on and off to generate the optical signal.

8. The ground surface location system of claim 7, wherein the light source is turned on and off at a flash rate above a maximum rate perceptible to humans.

9. The ground surface location system of claim 7, wherein the power switch control signal comprises a serial data stream encoded with the physical location code by the signal processor using the Manchester coding scheme.

10. The ground surface location system of claim 9, wherein the power switch control signal provides a fifty percent duty cycle to the power switch.

11. The ground surface location system of claim 4, wherein the location transmitter further comprises:
    an infrared setup port configured to receive an infrared signal representative of a physical location code and to provide the physical location code to the location encoder.

12. The ground surface location system of claim 1, wherein the location identifier further comprises:
    an optical receiver configured to receive and convert the optical signal to an electrical signal;
    a signal processor having the object identification code stored therein and receiving the electrical signal and providing an object location code representative of the object identification code and the physical location code; and a transmitter configured to transmit the identification signal, wherein the identification signal is representative of the object location code.

13. The ground surface location system of claim 12, wherein the optical receiver further comprises:
a plurality of optical sensors each configured to receive and convert a separate optical signal representative of a physical location code into a corresponding electrical signal.

14. The ground surface location system of claim 13, wherein the signal processor is configured to receive the corresponding electrical signal from each optical sensor of the plurality of optical sensors and to provide an object location code representative of the object identification code and the physical location code of the location transmitter to which the location identifier is in closest proximity.

15. The ground surface location system of claim 1, further comprising:
a data receiving system configured to receive the identification signal and to provide identification of the object and its location within the coverage area on a visual display.

16. The system of claim 1, wherein the airfield guidance marker is a Federal Aviation Association airfield guidance marker.

17. The system of claim 1, wherein the wireless transmitter comprises a radio frequency transmitter.

18. An airfield ground surface location system comprising:
a location transmitter positioned at a location on an airfield and comprising:
a light source configured to receive power from a power source; and
a location encoder having a physical location code (PLC) representative of the location stored therein and configured to generate an optical signal encoded with the PLC by turning the power to the light source on and off based on the PLC; and
a location identifier configured to couple to a vehicle and comprising:
an optical receiver configured to receive and convert the optical signal to an electrical signal;
a signal processor having a vehicle code representative of the vehicle stored therein and configured to decode the PLC from the electrical signal and to provide a vehicle location code representative of the vehicle code and the PLC; and
a wireless transmitter configured to transmit an identification signal representative of the vehicle location code.

19. The system of claim 18, further comprising:
a plurality of location transmitters positioned at a plurality of locations within the coverage area, each location transmitter having stored therein a corresponding physical location code representative of the location at which it is positioned and each configured to transmit an optical signal representative of the corresponding physical location code.

20. The system of claim 19, wherein the location identifier is further configured to receive a plurality of optical signals and to transmit a signal representative of the object identification code and the physical location code of the location transmitter to which the location identifier is in closest proximity.

21. The system of claim 18, wherein the light source comprises an light emitting diode (LED) array.

22. The system of claim 18, wherein the light source comprises a laser diode.

23. The system of claim 18, wherein the light fixture comprises an airfield guidance marker.

24. The system of claim 18, wherein the location encoder comprises:
a power switch connectable to the power source and having a control gate and configured to provide power to the light source;
a microcontroller having the physical location code stored therein and configured to provide to the control gate a power switch control signal representative of the physical location code that causes the power switch to turn the power to the light source on and off to generate the optical signal.

25. The system of claim 24, wherein the light source is turned on and off at a flash rate above a maximum rate perceptible to humans.

26. The system of claim 24, wherein the power switch control signal comprises a serial data stream encoded with the physical location code by the signal processor using the Manchester coding scheme.

27. The system of claim 26, wherein the power switch control signal provides a fifty percent duty cycle to the power switch.

28. The system of claim 18, wherein the location transmitter further comprises:
an infrared setup port configured to receive an infrared signal representative of a physical location code and to provide the physical location code to the location encoder.

29. The system of claim 18, wherein the optical receiver further comprises:
a plurality of optical sensors each configured to receive and convert a separate optical signal representative of a physical location code into a corresponding electrical signal.

30. The system of claim 29, wherein the signal processor is configured to receive the corresponding electrical signal from each optical sensor of the plurality of optical sensors and to provide an object location code representative of the object identification code and the physical location code of the location transmitter to which the location identifier is in closest proximity.

31. The system of claim 18, wherein the vehicle is an aircraft and the object identification code includes a tail number component and flight number component associated with the aircraft, wherein the tail number component is stored in the location identifier and the location identifier is further configured to receive the flight number component from a memory within the aircraft.

32. The system of claim 18, wherein the location identifier is adapted to couple to an underbody of the aircraft.

33. The system of claim 18, further comprising:
a data receiving system configured to receive the identification signal and to provide identification of the object and its location within the coverage area.

34. The system of claim 33, wherein the data receiving system provides identification of the corresponding object and its location within the coverage area on a visual display, wherein the identification includes a tail number and a flight when the object is an aircraft.

35. An airfield ground surface location system comprising:
a plurality of airfield guidance markers, each airfield guidance marker positioned at a location on an airfield and providing guidance illumination for visually directing aircraft on the airfield, each airfield guidance marker including:

a light source providing the visual guidance illumination; and a location encoder having a physical location code representative of the location at which airfield guidance marker is position stored therein and configured to modulate the light source to optically encode the visible guidance illumination with the physical location code, wherein location encoder modulates the light source at a frequency imperceptible to human vision so that the light source simultaneously provides the visual guidance illumination and physical location code with the physical location code being imperceptible to human vision; and a location identifier coupled to an aircraft and having an aircraft code representative of the aircraft stored therein, the location identifier including:

an optical receiver configured to receive the visible guidance illumination and to detect the physical location code encoded therein; and a wireless transmitter configured to transmit an identification signal representative of the vehicle identification code and the detected physical location code to a surface movement control system.

\* \* \* \* \*